US012761488B2

(12) United States Patent
Zhang et al.

(10) Patent No.: US 12,761,488 B2
(45) Date of Patent: Oct. 13, 2026

(54) HEAD-MOUNTED DISPLAY DEVICE

(71) Applicant: MATRIXED REALITY TECHNOLOGY CO., LTD., Wuxi (CN)

(72) Inventors: Tongfu Zhang, Beijing (CN); Yuanyuan Wu, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 391 days.

(21) Appl. No.: 18/547,162

(22) PCT Filed: Feb. 21, 2022

(86) PCT No.: PCT/CN2022/077009
§ 371 (c)(1),
(2) Date: Aug. 21, 2023

(87) PCT Pub. No.: WO2022/174824
PCT Pub. Date: Aug. 25, 2022

(65) Prior Publication Data

US 2024/0134207 A1 Apr. 25, 2024
US 2024/0231113 A9 Jul. 11, 2024

(30) Foreign Application Priority Data

Feb. 22, 2021 (CN) ......................... 202110200491.4

(51) Int. Cl.
*G02B 27/01* (2006.01)

(52) U.S. Cl.
CPC ................................ *G02B 27/0176* (2013.01)

(58) Field of Classification Search
CPC ............ G02B 27/0176; G02B 27/0149; G02B 2027/0154; G02B 2027/0159; G02B 2027/0181; G02B 27/01; A42B 1/245
See application file for complete search history.

(56) References Cited

U.S. PATENT DOCUMENTS

2007/0018908 A1 1/2007 Nakabayashi et al.
2011/0265254 A1 11/2011 Ma et al.
(Continued)

FOREIGN PATENT DOCUMENTS

CN 106461942 A 2/2017
CN 206147177 U 5/2017
(Continued)

OTHER PUBLICATIONS

International Search Report received in the corresponding International Application PCT/CN2022/122740, mailed Dec. 19, 2022.
(Continued)

*Primary Examiner* — Melissa J Koval
(74) *Attorney, Agent, or Firm* — K&L Gates LLP

(57) ABSTRACT

A head-mounted display device relates to the field of electronic products. The head-mounted display device includes a display apparatus (200) and a headband apparatus (100), a first side and a second side of the headband apparatus (100) being connected to the display apparatus (200), respectively, the headband apparatus (100) including a first headband assembly (110), a second headband assembly (120), a first retractable assembly (130) and a second retractable assembly (140), wherein the first headband assembly (110) includes a first end and a second end; the second headband assembly (120) is arranged opposite to the first headband assembly (110), and the second headband assembly (120) includes a third end and a fourth end; the first retractable assembly (130) is connected to the first end and the third end; and the second retractable assembly (140) is arranged opposite to the first retractable assembly (130), and the second retractable assembly (140) is connected to the second end and the fourth end; and in the case where at least one of the first retractable assembly (130) and the second retractable assembly (140) is in an extended state, when an external
(Continued)

force is applied to at least one of the first side and the second side of the headband apparatus (100), the display apparatus (200) is configured to reciprocate in a first direction.

19 Claims, 9 Drawing Sheets

(56) References Cited

U.S. PATENT DOCUMENTS

| | | | | |
|---|---|---|---|---|
| 2016/0054570 | A1* | 2/2016 | Bosveld et al. | G02B 27/01 |
| 2016/0054571 | A1* | 2/2016 | Tazbaz et al. | G02B 27/01 |
| 2016/0216512 | A1* | 7/2016 | Miller et al. | G02B 27/01 |
| 2018/0335632 | A1 | 11/2018 | Cho et al. | |
| 2019/0159354 | A1* | 5/2019 | Zheng | H05K 5/0217 |
| 2019/0346682 | A1* | 11/2019 | Kang et al. | G02B 27/01 |
| 2021/0349322 | A1* | 11/2021 | Harris | G02B 27/0176 |

FOREIGN PATENT DOCUMENTS

| | | | |
|---|---|---|---|
| CN | 206489325 | U | 9/2017 |
| CN | 107251547 | A | 10/2017 |
| CN | 207992564 | U | 10/2018 |
| CN | 109239921 | A | 1/2019 |
| CN | 110031973 | A | 7/2019 |
| CN | 110068928 | A | 7/2019 |
| CN | 110441910 | A | 11/2019 |
| CN | 211786370 | U | 10/2020 |
| CN | 215067522 | U | 12/2021 |
| WO | 2019135210 | A1 | 7/2019 |

OTHER PUBLICATIONS

First office action received in the corresponding Chinese Application 202110200491.4, mailed Jan. 11, 2023.

ESR received in EP Application No. 22755597.6; mailed Jul. 12, 2024.

The first office action of CN Application No. 202311282667.0, mailed Mar. 30, 2026, 11 pages.

* cited by examiner

HEAD-MOUNTED DISPLAY DEVICE

TECHNICAL FIELD

The present application relates to the technical field of electronic products, in particular to a head-mounted display device.

BACKGROUND

A head-mounted display device, such as, augmented reality glasses, virtual reality glasses, mixed reality glasses, etc., is a device that can be worn on a user's head and has a display function. Powerful functions can be achieved by software support, data interaction and cloud interaction, and the head-mounted display device is deeply favored by users. However, during wearing, it brings inconvenience to users due to various head circumference sizes of the users. To solve the above-mentioned problem, a conventional head-mounted display device is added with a lengthenable or shortenable structure at the tail of a headband so that the headband can expand or contract.

SUMMARY

Embodiments of the present application provide a head-mounted display device, including a display device and a headband apparatus, the headband apparatus having a first side and a second side arranged opposite to the first side, the first side and the second side being connected to the display apparatus, the headband apparatus including a first headband assembly, a second headband assembly, a first retractable assembly and a second retractable assembly. The first headband assembly includes a first end and a second end arranged opposite each other; the second headband assembly is arranged opposite to the first headband assembly, and the second headband assembly includes a third end and a fourth end arranged opposite each other; the first retractable assembly is connected to the first end of the first headband assembly and the third end of the second headband assembly; the second retractable assembly is arranged opposite to the first retractable assembly, and the second retractable assembly is connected to the second end of the first headband and the fourth end of the second headband assembly; and in the case where at least one of the first retractable assembly and the second retractable assembly is in an extended state, when an external force is applied to at least one of the first side and the second side of the headband apparatus, the display apparatus is movable in a first direction or a direction opposite to the first direction, wherein the first direction is perpendicular to an arrangement direction of the first side and the second side of the headband apparatus.

Figure 1:
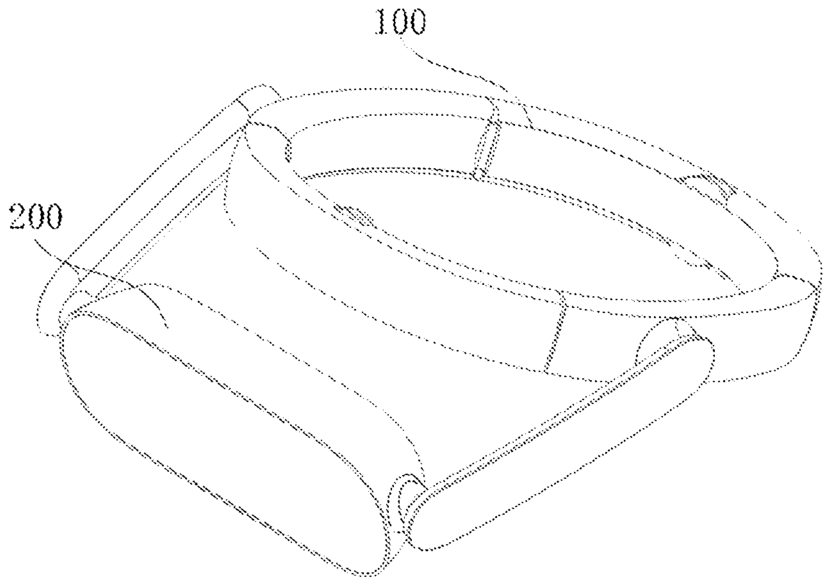
FIG. 1 is a structural view of a head-mounted display device disclosed in embodiments of the present application.

Reference numerals in the accompanying drawings:

100—headband apparatus; 110—first headband assembly; 111—first headband body; 1111—bump; 1112—second fixing groove; 112—third housing; 120—second headband assembly; 121—second headband body; 122—fourth housing; 130—first retractable assembly; 131—elastic component; 132—turntable; 1321—accommodating recess; 1322—second limiting groove; 1323—annular groove; 1324—first fixing groove; 133—first traction cord; 1331—fixing block; 134—second traction cord; 135—connecting strap; 136—first elastic element; 137—second elastic element; 138—first elastic member; 139—second elastic member; 1310—elastic part; 140—second retractable assembly; 150—mounting assembly; 151—first mounting member; 1511—slide; 1512—fixing post; 15121—first limiting groove; 1513—first accommodating recess; 1514—ring groove; 1515—receiving recess; 152—second mounting member; 153—first housing; 1531—first accommodating space; 154—second housing; 1541—second accommodating space; 200—display apparatus; 210—display body; 220—first connecting arm; 230—second connecting arm; 240—joint; 241—fixed portion; 242—movable portion; 2421—ball joint; 2422—shaft; 250—bracket; 251—third connecting arm; 252—fourth connecting arm.

DETAILED DESCRIPTION

Technical solutions in embodiments of the present application will be described below clearly and completely in conjunction with the accompanying drawings in the embodiments of the present application. Obviously, the described embodiments are a part of the embodiments of the present application, and not all the embodiments. All other embodiments obtained by those of ordinary skill in the art without creative work, based on embodiments in the present application, fall into the protection scope of the present application.

The terms "first", "second" and the like in the description and claims of the present application are used for distinguishing similar objects, and not for describing a specific order or sequence. It should be understood that data so used are interchangeable when appropriate so that the embodiments of the present application can be implemented in an order other than those illustrated or described herein. Moreover, the objects distinguished by the terms "first", "second" and so on are generally of one type, and the number of objects is not limited. For example, there may be one or a plurality of first objects. In addition, the term "and/or" in the description and the claims indicates at least one of objects connected by the term, and the character "I" herein generally indicates that the associated objects prior to and following it are in an "or" relationship.

A head-mounted display device provided in embodiments of the present application will be described in detail below using specific embodiments and application scenarios in conjunction with the drawings.

Referring to FIG. 1, embodiments of the present application disclose a head-mounted display device including a display apparatus 200 and a headband apparatus 100. The headband apparatus 100 has a first side and a second side. The first side and the second side are arranged opposite to each other, and the first side and the second side each are connected to the display apparatus 200, to achieve interconnection between the display apparatus 200 and the headband apparatus 100.

The headband apparatus 100 includes a first headband assembly 110, a second headband assembly 120, a first retractable assembly 130, and a second retractable assembly 140. Optionally, the first headband assembly 110 includes a first end and a second end, and the first end and the second end are arranged opposite each other, i.e., the first end and the second end are respectively two ends in an extension direction of the first headband assembly 110. The second headband assembly 120 is arranged opposite to the first headband assembly 110. When a user wears the head-mounted display device, the second headband assembly 120 and the first headband assembly 110 are respectively located on two opposite sides, e.g., left and right sides, or front and rear sides, of the user's head. The second headband assembly 120 includes a third end and a fourth end. The third end and the fourth end are arranged opposite each other, i.e., the third end and the fourth end are respectively two ends in an extension direction of the second headband assembly 120.

In order to connect the first headband assembly 110 to the second headband assembly 120, and to adaptively adjust the circumference of the headband apparatus 100 to accommodate to users with different head circumferences, in embodiments of the present application, the first retractable assembly 130 is arranged between the first end of the first headband assembly 110 and the third end of the second headband assembly 120, and the second retractable assembly 140 is arranged between the second end of the first headband assembly 110 and the fourth end of the second headband assembly 120. Since the first headband assembly 110 and the second headband assembly 120 are arranged opposite to each other, with the first retractable assembly 130 in connection between the first end and the third end, and the second retractable assembly 140 in connection between the second end and the fourth end, the first retractable assembly 130 and the second retractable assembly 140 are also arranged opposite to each other. In some optional embodiments, the first headband assembly 110 and the second headband assembly 120 may be arranged directly opposite to each other, i.e., arranged symmetrically, e.g., in a left-right symmetrical, or front-rear symmetrical manner. The first retractable assembly 130 and the second retractable assembly 140 can also be arranged symmetrically, e.g., in a front-rear symmetrical, or left-right symmetrical manner. In this way, the first headband assembly 110, the first retractable assembly 130, the second headband assembly 120, and the second retractable assembly 140 are connected sequentially to form, in an enclosing manner, a ring-shaped headband apparatus 100 that can be extended or retracted. When at least one of the first headband assembly 110, the second headband assembly 120, the first retractable assembly 130, and the second retractable assembly 140 that form, in an enclosing manner, the headband apparatus 100 is subjected to an external force, the circumference of the headband apparatus 100 can change. Both the first retractable assembly 130 and the second retractable assembly 140 can be in an extended state and a retracted state. In the extended state, a portion of the first retractable assembly 130 or the second retractable assembly 140 connected to the first headband assembly 110 or the second headband assembly 120 extends outwardly. In the retracted state, the portion of the first retractable assembly 130 or the second retractable assembly 140 connected to the first headband assembly 110 or the second headband assembly 120 retracts inwardly. The terms "in" and "out" herein indicate directions relative to the first retractable assembly 130 or the second retractable assembly 140 itself. For example, when at least one of the first retractable assembly 130 and the second retractable assembly 140 is in the extended state, the headband apparatus is extended, and its circumference becomes larger. When the headband apparatus retracts under the action of the first retractable assembly 130 and the second retractable assembly 140, its circumference becomes smaller. It should be noted here that generally, the headband apparatus 100, when in the retracted state, having a dimension smaller than that of a user's head circumference, and the headband apparatus 100 can be worn only when being extended.

In a state where the headband apparatus 100 is extended, when an external force is applied to at least one of the first side and the second side of the headband apparatus 100, the display apparatus 200 can move in a first direction or a direction opposite to the first direction. The first direction is perpendicular to an arrangement direction of the first side and the second side of the headband apparatus 100. It can also be understood as meaning that the display apparatus can reciprocate in the first direction. The "arrangement direction" herein can be understood as the direction of a connecting line between the first side and the second side. It should be noted here that when the headband apparatus 100 is worn on a user's head, the first side and the second side of the headband apparatus 100 may be at a left side and a right side of the user, or at a front side or a rear side of the user, and of course, may also be at other two opposite sides, which is not limited in embodiments of the present application. Here, the first side and the second side being at the left side and the right side of the user can be used as an example, and the first direction is a front-rear direction of the user. It can be seen that when an external force is applied to at least one of the first side and the second side of the headband apparatus 100 after the headband apparatus 100 is extended, since the first retractable assembly 130 and the second retractable assembly 140 are arranged opposite to each other, as one of the retractable assemblies is in the extended state, the other retractable assembly can be in the retracted state, such that under the precondition of substantially no change in the circumference of the headband apparatus 100, the display apparatus 200 moves in the front-rear direction of the user, and thereby the distance between a core component (e.g., a display body 210) of the display apparatus 200 and the user's face, eyes, or other part can be adjusted, to achieve a relatively comfortable distance between the display apparatus 200 and the user's face, eyes, or other part. Since the circumference of the headband apparatus 100 can remain substantially unchanged when the distance between the display apparatus 200 and the user is adjusted, thus a force on the user during the adjustment does not change obviously, a pressure applied on the head by the headband apparatus 100 remains substantially unchanged, and the user has no sensation of constricting due to the adjustment of the distance.

Based on the above configuration, to wear the head-mounted display device, the headband apparatus 100 can be directly sleeved over a user's head, and the circumference of the headband apparatus 100 can be changed by relative movement between any adjacent two of the first headband assembly 110, the first retractable assembly 130, the second headband assembly 120 and the second retractable assembly 140, so that the headband apparatus 100 accommodates to users with different head circumferences to solve the problem that the headband apparatus 100 clamps the user's head and affects the wearing comfort, and the distance between the display apparatus 200 and the user's face, eyes, or other part can also be adaptively adjusted to improve the user's observation experience.

In some embodiments, the first headband assembly 110 is arranged at the first side of the headband apparatus 100, and the second headband assembly 120 is arranged at the second side of the headband apparatus 100. The display apparatus 200 is connected to the first headband assembly 110 and the second headband assembly 120. Optionally, the display apparatus 200 can be connected to the first headband assembly 110 through a first connecting arm 220 and to the second headband assembly 120 through a second connecting arm 230. When the head-mounted display device is worn, the display apparatus 200 is located in front of a user, and the first connecting arm 220 and the second connecting arm 230 are respectively located on the left side and the right side of the user. The first headband assembly 110 and the second headband assembly 120 may also be respectively located on the left side and the right side of the user, and the first retractable assembly 130 and the second retractable assembly 140 are respectively located on the front side and the rear side of the user.

In some other embodiments, it is also possible that the first retractable assembly 130 is arranged at the first side of the headband apparatus 100, and the second retractable assembly 140 is arranged at the second side of the headband apparatus 100. The display apparatus 200 is connected to the first retractable assembly 130 and the second retractable assembly 140. Optionally, the display apparatus 200 can be connected to the first retractable assembly 130 through a first connecting arm 220 and to the second retractable assembly 140 through a second connecting arm 230. When the head-mounted display device is worn, the display apparatus 200 is also located in front of a user, the first connecting arm 220 and the second connecting arm 230 are respectively located on the left side and the right side of the user, the first retractable assembly 130 and the second retractable assembly 140 are respectively located on the left side and the right side of the user, and the first headband assembly 110 and the second headband assembly 120 are respectively located on the front side and the rear side of the user.

The headband apparatus 100 in embodiments of the present application can be worn in a variety of ways. For example, the first headband assembly 110 and the second headband assembly 120 are respectively located on a left front side and a right rear side of a user, and correspondingly, the first retractable assembly 130 and the second retractable assembly 140 are respectively located on a left rear side and a right front side of the user, and so on. The way of wearing the headband apparatus 100 is not limited in the present application, as long as the display apparatus 200 can be located in front of the user and the headband apparatus 100 is adjustable in circumference.

Figure 2:
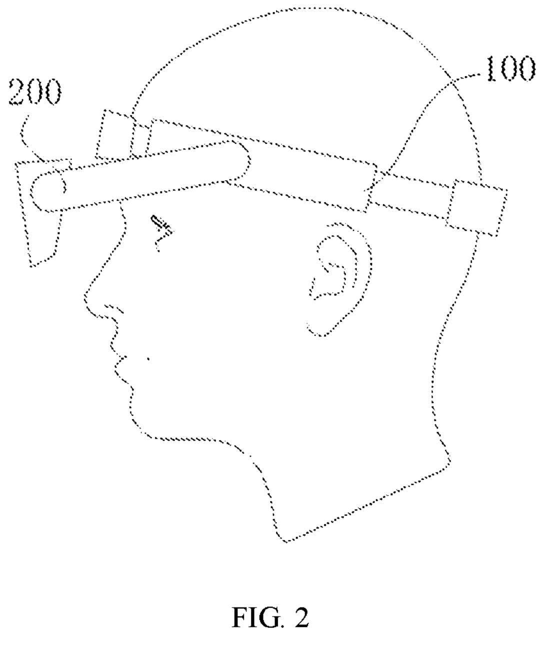
FIG. 2 is a schematic view of a head-mounted display device disclosed in embodiments of the present application in a first wearing state.
Figure 3:
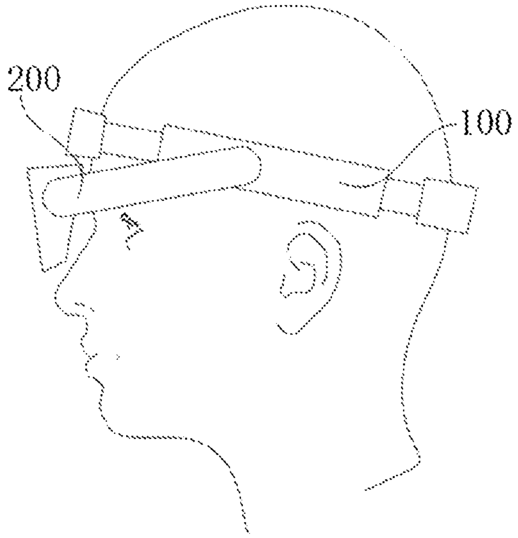
FIG. 3 is a structural view of a head-mounted display device disclosed in embodiments of the present application in a second wearing state.
Figure 4:
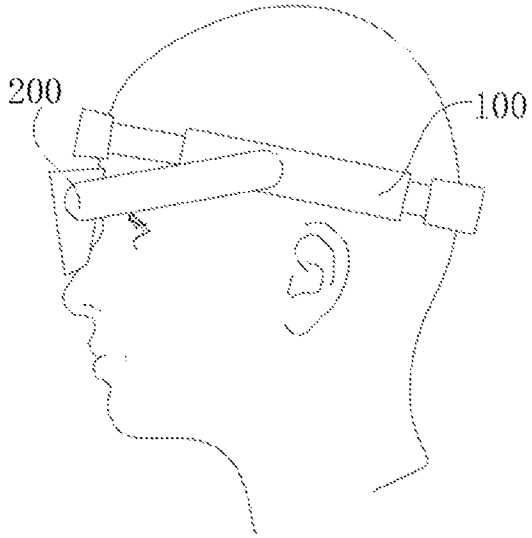
FIG. 4 is a schematic view of a head-mounted display device disclosed in embodiments of the present application in a third wearing state.

In some embodiments, the first headband assembly 110 being arranged at the first side of the headband apparatus 100 and the second headband assembly 120 being arranged at the second side of the headband apparatus 100 can be used as an example. When an external force is applied to at least one of the first headband assembly 110 and the second headband assembly 120, the first end of the first headband assembly 110 is movable relative to the third end of the second headband assembly 120. Meanwhile, the second end of the first headband assembly 110 is movable relative to the fourth end of the second headband assembly 120. A trend of movement of the first end relative to the third end is opposite to a trend of movement of the second end relative to the fourth end. Referring to FIGS. 2 to 4, first, a first external force is applied to the headband apparatus 100, for example, a first external force is applied to at least one of the first headband assembly 110, the second headband assembly 120, the first retractable assembly 130, and the second retractable assembly 140, so that the headband apparatus 100 can be extended. In this process, the first headband assembly 110 and the second headband assembly 120 respectively move in directions facing away from each other, and the first retractable assembly 130 and the second retractable assembly 140 respectively move in directions facing away from each other, so that the circumference of the headband apparatus 100 becomes larger, the headband apparatus 100 can be worn on a user's head, at which time the display apparatus 200 is located in front of the user's face.

A second external force is applied to at least one of the first headband assembly 110 and the second headband assembly 120, such that the first end of the first headband assembly 110 and the third end of the second headband assembly 120 move relative to each other, e.g., moving toward each other (i.e., moving closer to each other) or moving away from each other (i.e., moving farther from each other), and the second end of the first headband assembly 110 and the fourth end of the second headband assembly 120 move relative to each other, e.g., moving away from each other (i.e., moving farther from each other) or moving toward each other (i.e., moving closer to each other). Based on the above movement, a trend of movement of the first end of the first headband assembly 110 relative to the third end of the second headband assembly 120 is opposite to a trend of movement of the second end of the first headband assembly 110 relative to the fourth end of the second headband assembly 120. For example, two ends of the first headband assembly 110 and the second headband assembly 120 located on the front side of the user move closer to each other, and two ends thereof located on the rear side of the user move farther from each other, which can be regarded as forward movement of the display apparatus 200 relative to the user's face, eyes, or other part, such that the distance between the display apparatus 200 and the user's face, eyes, or other part is increased, specifically referring to FIG. 2. Conversely, the two ends of the first headband assembly 110 and the second headband assembly 120 located on the front side of the user move farther from each other, and the two ends thereof located on the rear side of the user move closer to each other, which can be regarded as rearward movement of the display apparatus 200 relative to the user's face, eyes, or other part, such that the distance between the display apparatus 200 and the user's face, eyes, or other part is reduced, specifically referring to FIG. 4. Based on the above configuration, the distance between the display apparatus 200 and the user's face, eyes, or other part can be adjusted to achieve a good observation effect.

To improve the stability of the connection between the headband assemblies and the retractable assemblies that are arranged adjacently, in embodiments of the present application, the headband apparatus 100 further includes a mounting assembly 150. The mounting assembly 150 includes a first mounting member 151 and a second mounting member 152. Optionally, the first mounting member 151 can be connected to the first retractable assembly 130, and the second mounting member 152 can be connected to the second retractable assembly 140. Based on this, the mounting assembly 150 can provide a mounting base for respective retractable assemblies. In addition, the mounting assembly 150 can also provide a mounting base for respective headband assemblies, and ensures both the mounting of the headband assemblies and the relative movements of the headband assemblies relative to the retractable assemblies, so that the headband apparatus 100 can be extended or retracted.

In some optional embodiments, the first mounting member 151 and the second mounting member 152 may be same in structure. The structure will be described specifically below using the first mounting member 151 as an example. Referring to FIGS. 6, 7, and 9 to 15, the first mounting member 151 includes a slide 1511, with a segment of the first headband assembly 110 adjacent to the first end and a segment of the second headband adjacent to the third end being slidably arranged in the slide 1511, respectively. The segment of the first headband assembly 110 adjacent to the first end is slidable relative to the first mounting member 151, and the segment of the second headband assembly 120 adjacent to the third end is slidable relative to the first mounting member 151, so that the first end of the first headband assembly 110 and the third end of the second headband assembly 120 can move closer to each other or farther from each other. Similarly, the second mounting member 152 includes a slide 1511, with a segment of the first headband assembly 110 adjacent to the second end and a segment of the second headband assembly 120 adjacent to the fourth end being slidably arranged in the slide 1511, respectively. The segment of the first headband assembly 110 adjacent to the second end is slidable relative to the second mounting member 152, and the segment of the second headband assembly 120 adjacent to the fourth end is slidable relative to the second mounting member 152, so that the second end of the first headband assembly 110 and the fourth end of the second headband assembly 120 can move closer to each other or farther from each other. It should be noted here that the above-mentioned slide 1511 can be used for guiding, limiting and other functions, and its specific shape is not limited. Besides, the segment of the first headband assembly 110 adjacent to the first end includes the first end and a local part with a certain size near the first end, and similarly, for specific meanings of the segment adjacent to the second end, the segment adjacent to the third end, and the segment adjacent to the fourth end, reference can be made to that of the segment adjacent to the first end.

Figure 6:
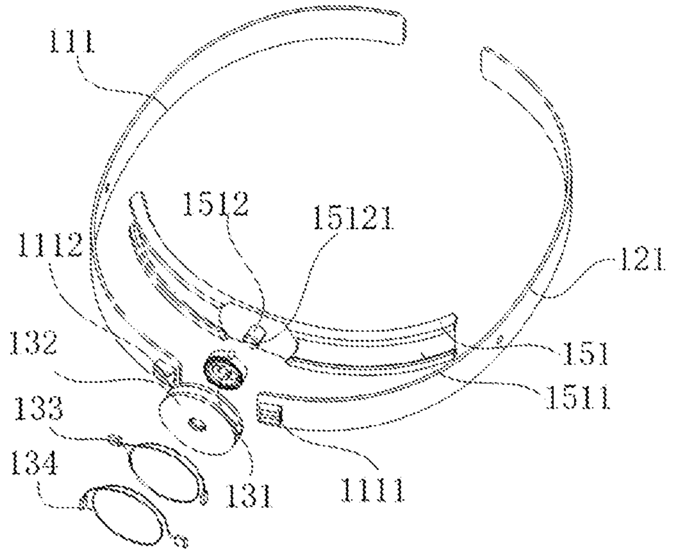
FIG. 6 an exploded view of a headband apparatus including a headband assembly, a retractable assembly and a mounting assembly disclosed in embodiments of the present application.
Figure 7:
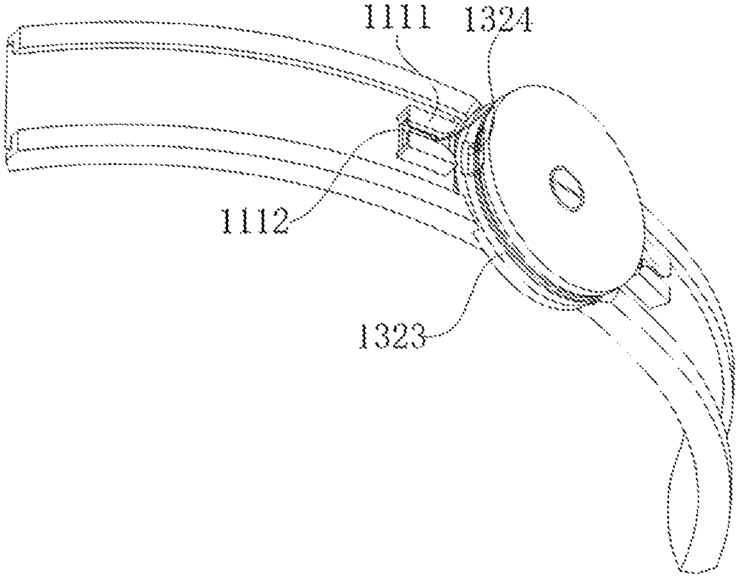
FIG. 7 is an assembly view of a retractable assembly and a mounting assembly in a headband apparatus disclosed in embodiments of the present application.
Figure 8:
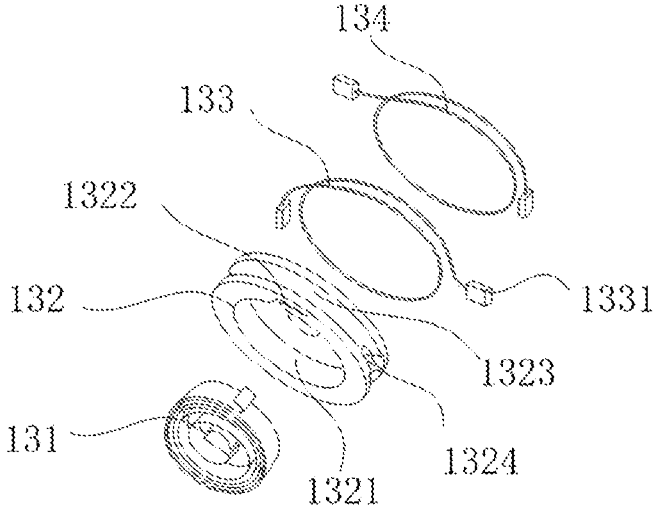
FIG. 8 is an exploded view of a retractable assembly in a headband apparatus disclosed in embodiments of the present application.

Referring to FIGS. 6 to 8, in an embodiment, each of the first retractable assembly 130 and the second retractable assembly 140 may include an elastic component 131, a turntable 132, a first traction cord 133, and a second traction cord 134. The turntable 132 is rotatably provided on the first mounting member 151 or the second mounting member 152. Here, it means that a turntable 132 is rotatably provided on each of the first mounting member 151 and the second mounting member 152, i.e., a turntable 132 of the first retractable assembly 130 is rotatably provided on the first mounting member 151, and a turntable 132 of the second retractable assembly 140 is rotatably provided on the second mounting member 152. In conjunction with the drawings, similar expressions below can be similarly understood. For example, a shaft part or a columnar part or the like is provided on the first mounting member 151 or the second mounting member 152, and the turntable 132 is sleeved over the shaft part or columnar part or other structure so that the turntable 132 can rotate. The elastic component 131 is connected between the first mounting member 151 and the turntable 132, or the elastic component 131 is connected between the second mounting member 152 and the turntable 132. The turntable 132 can rotate on the first mounting member 151 or the second mounting member 152 under the elastic action of the elastic component 131. The first traction cord 133 is wound around the turntable 132, and its two ends are respectively connected to the first headband assembly 110 (e.g., the first or third end) and the turntable 132. When the first headband assembly 110 moves under force, the turntable 132 can be pulled by the first traction cord 133 to rotate. When the friction between the first headband assembly 110 and the first mounting member 151 or the second mounting member 152 is relatively small, the turntable 132 can rotate under the elastic action of the elastic component 131, and the first headband assembly 110 is pulled by the first traction cord 133 to move relative to the first mounting member 151 or the second mounting member 152. An end of the first headband assembly 110 is connected to the turntable 132 by the first traction cord 133 to achieve synchronized motion. The second traction cord 134 is wound around the turntable 132, and its two ends are respectively connected to the second headband assembly 120 (e.g., the second or fourth end) and the turntable 132.

When the second headband assembly 120 moves under force, the turntable 132 can be pulled by the second traction cord 134 to rotate. When the friction between the second headband and the first mounting member 151 or the second mounting member 152 is relatively small, the turntable 132 can rotate under the elastic action of the elastic component 131, and an end of the second headband assembly 120 is connected to the turntable 132 by the second traction cord 134 to achieve synchronized motion. It should be noted here that the winding directions of the first traction cord 133 and the second traction cord 134 can be same or different, as long as it ensures that when the first headband assembly 110 and the second headband assembly 120 move relative to each other, the turntable 132 moves in the same direction.

Optionally, the first mounting member 151 and the second mounting member 152 each are provided with a fixing post 1512, and the turntable 132 is rotatably connected to the fixing post 1512 so that the turntable 132 can be rotated. The fixing post 1512 is provided with a first limiting groove 15121. Optionally, the first limiting groove 15121 can extend in an axial direction of the fixing post 1512. Of course, the first limiting groove may also be provided in other manners. The turntable 132 can be provided with an accommodating recess 1321 on a side of its axial direction, and with a second limiting groove 1322 in an inner wall defining the accommodating recess 1321. Based on this, the elastic component 131 may be a torsion spring (or as shown, called a spiral spring). The spiral spring is sleeved over the fixing post 1512, and an end of the spiral spring at an inner turn is arranged in the first limiting groove 15121. The spiral spring is as a whole embedded into the accommodating recess 1321, and an end of the spiral spring at an outer turn of is arranged in the second limiting groove 1322. In this way, not only is fixed installation of the spiral spring achieved, but also the turntable 132 is connected to the first mounting member 151 or the second mounting member 152 by the spiral spring so that the turntable 132 have a certain rotation restoring force under the elastic action of the spiral spring. It should be noted here that the spiral spring can be provided with many turns, and in this case, the spiral spring with many turns can be regarded as a constant force spring, i.e., when the spiral spring is stretched, an internal stress resists a load force, which is same as in the case of an ordinary spring, but its coefficient is close to a constant (zero). An elastic force of the constant force spring is relatively constant, and the constant force spring can output a nearly linear elastic force, to ensure that there is no change due to a change in the elastic force during force application. For the specific principle of the constant force spring, reference can be made to the related art, and it will not be described in detail here.

To achieve the arrangement of the traction cords, in embodiments of the present application, an outer peripheral surface of the turntable 132 is provided with an annular groove 1323 in the direction of its circumference. The first traction cord 133 and the second traction cord 134 are wound in the annular groove 1323 of the same one turntable 132, and side walls defining the annular groove 1323 on two axial sides of the turntable 132 function to limit the first traction cord 133 and the second traction cord 134, to prevent the traction cords from falling off the turntable 132. To achieve connections between the respective traction cords and the respective headband assemblies, as well as connections between the respective traction cords and the turntable 132, in embodiments of the present application, a first fixing groove 1324 is provided on an outer periphery of the turntable 132. Optionally, the first fixing groove 1324 can be provided at the bottom of the annular groove 1323. A second fixing groove 1112 is provided on each of the first headband assembly 110 and the second headband assembly 120. Optionally, a bump 1111 is provided on each of the first headband assembly 110 and the second headband assembly 120, and a portion of material is removed from the bump 1111 to form the second fixing groove 1112. The first traction cord 133 and the second traction cord 134 each are provided with fixing blocks 1331 at two ends, and the fixing blocks 1331 at the two ends of each traction cord are arranged correspondingly in the first fixing groove 1324 and the second fixing groove 1112, respectively. That is, the fixing blocks 1331 at the two ends of the first traction cord 133 are arranged in the first fixing groove 1324 of the turntable 132 and the second fixing groove 1112 of the first headband assembly 110, respectively, and the fixing blocks 1331 at the two ends of the second traction cord 134 are arranged in the first fixing groove 1324 of the turntable 132 and the second fixing groove 1112 of the second headband assembly 120 respectively. The connection between each the first headband assembly 110 and the second headband assembly 120, and the same one turntable 132 by the first traction cord 133 and the second traction cord 134 is achieved by the cooperation of the fixing blocks 1331 with the first fixing groove 1324 and the second fixing groove 1112.

For the above embodiment, in the present application, the first headband assembly 110 can be arranged at the first side of the headband apparatus 100, and the second headband assembly 120 can be arranged at the second side of the headband apparatus 100. The display apparatus 200 may be connected to the first headband assembly 110 and the second headband assembly 120. Optionally, the display apparatus 200 may include two connecting arms, and is connected to the first headband assembly 110 and the second headband assembly 120 through the two connecting arms, respectively, so that the display apparatus 200 can be mounted to the headband apparatus 100.

Figure 9:
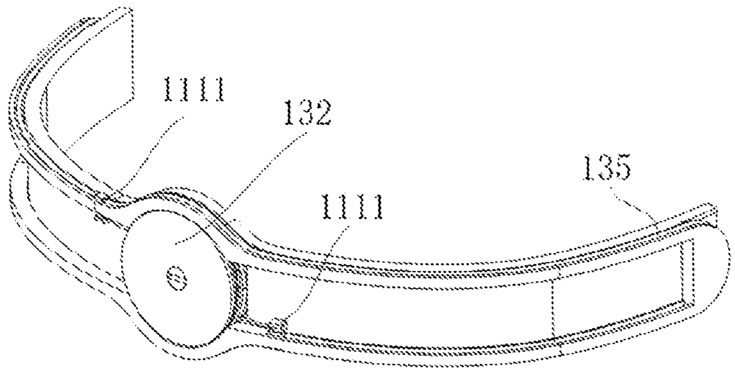
FIG. 9 is an assembly view of a retractable assembly and a mounting assembly in an optional headband apparatus disclosed in embodiments of the present application.
Figure 10:
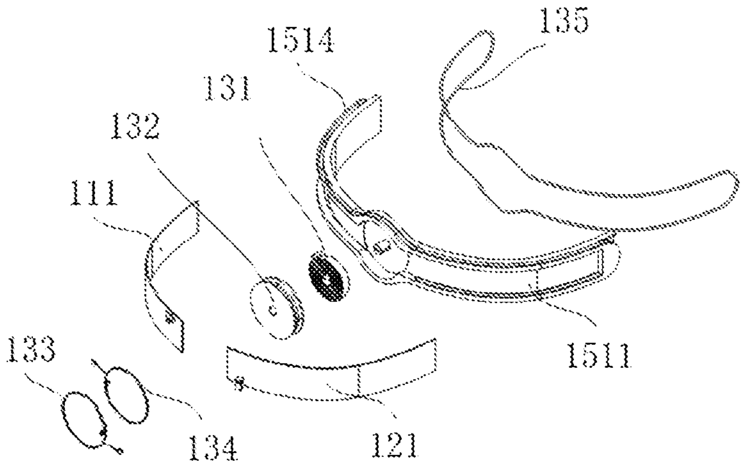
FIG. 10 is an exploded view of a retractable assembly and a mounting assembly in an optional headband apparatus disclosed in embodiments of the present application.

Referring to FIGS. 9 and 10, in an optional embodiment, a connecting strap 135 is winded around at least one of the first mounting member 151 and the second mounting member 152, and the first headband assembly 110 and the second headband assembly 120 are fixedly connected to the connecting strap 135. Optionally, the connecting strap 135 may be included in the first retractable assembly 130 or the second retractable assembly 140. Of course, the connecting strap 135 may also be included in the first mounting member 151 or the second mounting member 152. A portion of the connecting strap 135 connected to the first headband assembly 110 and a portion of the connecting strap connected to the second headband assembly 120 move in opposite directions as the connecting strap 135 rotates. In conjunction with the drawings, "moving in opposite directions" herein can be understood as meaning that the above-mentioned two connecting portions of the connecting strap 135 move farther from each other or closer to each other as the connecting strap 135 rotates. In embodiments with the connecting strap 135, the first retractable assembly 130 and the second retractable assembly 140 may include a turntable 132, a first traction cord 133, a second traction cord 134 and an elastic component 131, and the mounting of the turntable 132, the mounting of the elastic component 131, and the mounting of the first traction cord 133 and the second traction cord 134 may be similar to those in the first embodiment described above and will not be described here. Thus, it is also possible that the first traction cord 133 and the second traction cord 134 are fixedly connected to the connecting strap 135, and a portion of the connecting strap 135 connected to the first traction cord 133 and a portion of the connecting strap connected to the second traction cord 134 move in opposite directions as the connecting strap 135 rotates. It needs to ensure the connections between three parts: the connecting strap 135, the traction cords and the headband assemblies. Besides, the connecting strap 135 is added in this embodiment. Optionally, a ring groove 1514 is provided at an outer periphery of the first mounting member 151 or the second mounting member 152. The connecting strap 135 may be an annular cord, which is sleeved in the ring groove 1514, and the annular cord is movable in the ring groove 1514. Optionally, the first headband assembly 110 and the second headband assembly 120 each are provided with a bump 1111. The bump 1111 is provided with a second fixing groove 1112 for providing a fixing block 1331. The bump 1111 is also provided with a hole, into which the connecting strap 135 is threaded, and which allows the bump 1111 and the connecting strap 135 to be connected to each other. The first headband assembly 110 and the second headband assembly 120 are connected together by the connecting strap 135, so that when an external force is applied to at least one of the first headband assembly 110, the second headband assembly 120 and the connecting strap 135, the first headband assembly 110 and the second headband assembly 120 can be moved synchronously, thereby ensuring the synchronism and symmetry of the headband apparatus 100 in the process of being extended or retracted.

For the above embodiment, in the present application, the first headband assembly 110 can be arranged at the first side of the headband apparatus 100, and the second headband assembly can be arranged at the second side of the headband apparatus 100. The display apparatus 200 may be connected to the first headband assembly 110 and the second headband assembly 120. Optionally, the display apparatus 200 may include two connecting arms, and is connected to the first headband assembly 110 and the second headband assembly 120 through the two connecting arms, respectively, so that the display apparatus 200 can be mounted to the headband apparatus 100.

Figure 11:
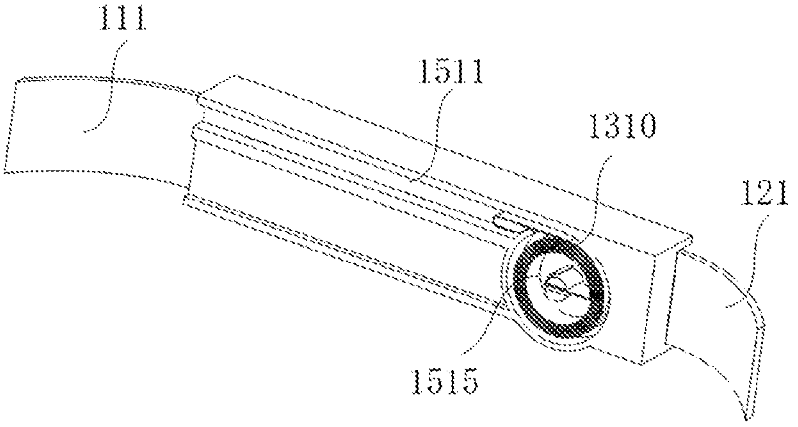
FIG. 11 is an assembly view of a headband assembly, a retractable assembly and a mounting assembly in another headband apparatus disclosed in embodiments of the present application.
Figure 12:
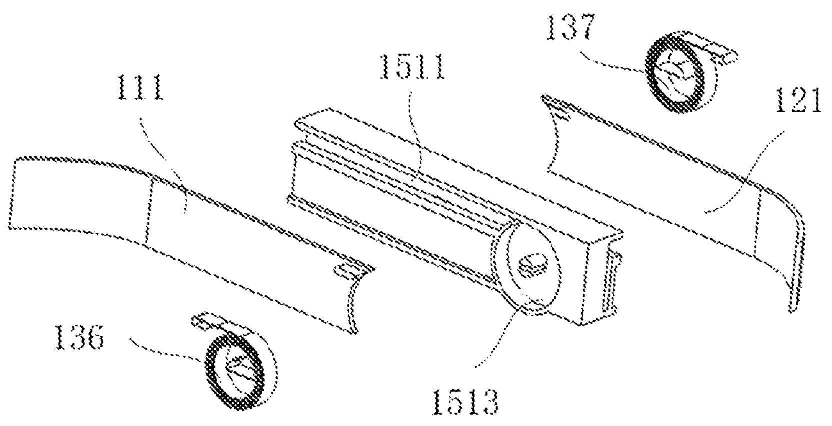
FIG. 12 is an exploded view of a headband assembly, a retractable assembly and a mounting assembly in another headband apparatus disclosed in embodiments of the present application.

Referring to FIGS. 11 and 12, in an optional embodiment, the headband apparatus 100 includes a mounting assembly 150. The mounting assembly 150 includes a first mounting member 151 and a second mounting member 152. The first mounting member 151 and the second mounting member 152 are substantially same in structure, and each define a first accommodating recess 1513 and a second accommodating recess (not shown in the drawings). Optionally, the first accommodating recess 1513 and the second accommodating recess can be respectively provided on two opposing sides of the first mounting member 151 or the second mounting member 152, i.e., the first mounting member 151 or the second mounting member 152 can be a sheet member, and the first accommodating recess 1513 and the second accommodating recess can be located on two sides of the sheet member, respectively. Optionally, the first mounting member 151 or the second mounting member 152 can be a component having an inner cavity, and the first accommodating recess 1513 and the second accommodating recess can be provided on two opposite side walls that define the inner cavity, respectively. At least one of the first retractable assembly 130 and the second retractable assembly 140 includes a first elastic element 136 and a second elastic element 137. The first elastic element 136 includes a first end and a second end. The first end can be arranged in the first accommodating recess 1513, and the second end can be connected to the first headband assembly 110. Optionally, the first elastic element 136 may be a spiral spring, which may be a constant force spring. A majority portion of the coil of the spiral spring is in the first accommodating recess 1513, and an end of the spiral spring at the inner turn may be a free end, or may be connected to a fixing post 1512 in the first accommodating recess 1513, and an outer turn of the spiral spring extends out of the first accommodating recess 1513 and then is connected to the first headband assembly 110. In order to mounting the first headband assembly 110, in embodiments of the present application, each of the first mounting member 151 and the second mounting member 152 is provided with a slide 1511, and the first headband assembly 110 is partially slidably arranged in the slide 1511. The first headband assembly 110 is provided with a limiting block, and the second end of the first elastic element 136 is hooked to the limiting block to connect the first elastic element 136 to the first headband assembly 110.

Similarly, the second elastic element 137 also includes a first end and a second end, wherein the first end can be arranged in the second accommodating recess, and the second end can be connected to the second headband assembly 120. Optionally, the second elastic element 137 may be a spiral spring, which may be a constant force spring. A majority portion of the coil of the spiral spring is in the second accommodating recess, and an end of the spiral spring at an inner turn may be a free end, or may be connected to a fixing post 1512 in the second accommodating recess, and an outer turn of the spiral spring extends out of the second accommodating recess and then is connected to the second headband assembly 120. In order to mounting the second headband assembly 120, in embodiments of the present application, each of the first mounting member 151 and the second mounting member 152 is provided with a slide 1511, and the second headband assembly 120 is partially slidably arranged in the slide 1511. The second headband assembly 120 is provided with a limiting block, and the second end of the second elastic element 137 is hooked to the limiting block to connect the second elastic element 137 to the second headband assembly 120.

Considering that the first headband assembly 110 and the second headband assembly 120 are respectively located on two sides of each mounting member, and that portions of the first headband assembly 110 and the second headband assembly 120 connected to the same mounting member move in opposite directions, the second end of the first elastic element 136 and the second end of the second elastic element 137 are arranged in opposite directions in embodiments of the present application. In this case, the elastic action of the first elastic element 136 on the first headband assembly 110 is opposite to the elastic action of the second elastic element 137 on the second headband assembly 120, i.e., both elastic forces are tensile forces toward the first mounting member 151 or the second mounting member 152, so that the first headband assembly 110 and the second headband assembly 120 have a trend of moving toward each other.

For the above embodiment, in the present application, the first headband assembly 110 can be arranged at the first side of the headband apparatus 100, and the second headband assembly 120 can be arranged at the second side of the headband apparatus 100, and the display apparatus 200 can be connected to the first headband assembly 110 and the second headband assembly 120. Of course, it is also possible that the first retractable assembly 130 is arranged at the first side of the headband apparatus 100, and the second retractable assembly 140 is arranged at the second side of the headband apparatus 100, and the display apparatus 200 can be connected to the first retractable assembly 130 and the second retractable assembly 140. Optionally, the first retractable assembly 130 and the second retractable assembly 140 each include a housing, and the display apparatus 200 can be connected to the respective housings of the first retractable assembly 130 and the second retractable assembly 140. It is also possible that the first mounting member 151 is arranged at the first side of the headband apparatus 100, and the second mounting member 152 is arranged at the second side of the headband apparatus 100, and the display apparatus 200 can be connected to the first mounting member 151 and the second mounting member 152.

Figure 13:
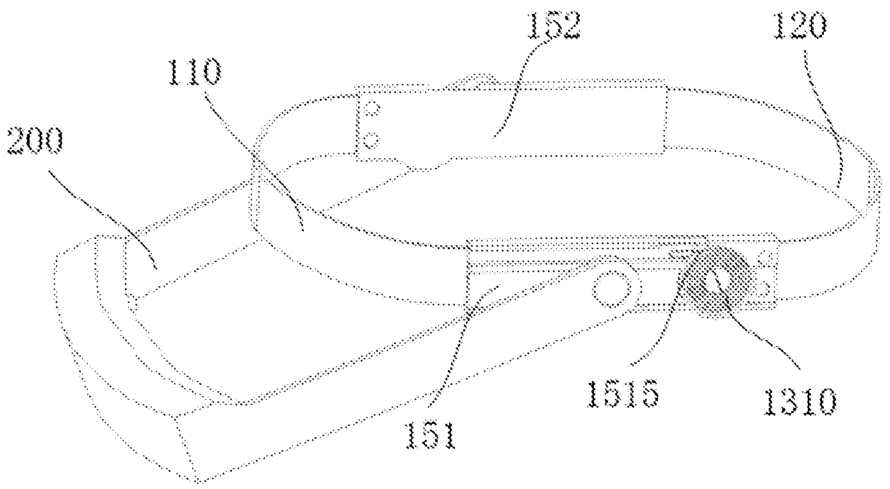
FIG. 13 an assembly view of a headband assembly, a retractable assembly and a mounting assembly in yet another headband apparatus, and a display apparatus disclosed in embodiments of the present application.
Figure 14:
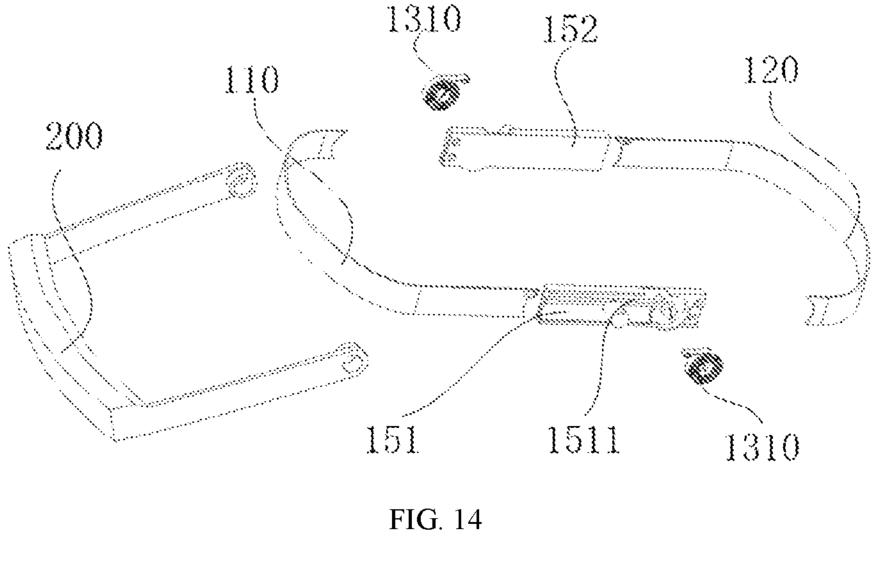
FIG. 14 an exploded view of a headband assembly, a retractable assembly and a mounting assembly in yet another headband apparatus, and a display apparatus disclosed in embodiments of the present application.

Referring to FIGS. 13 and 14, in an optional embodiment, the headband apparatus 100 further includes a mounting assembly 150. The mounting assembly 150 includes a first mounting member 151 and a second mounting member 152. Optionally, the first mounting member 151 and the second mounting member 152 are substantially same in structure, and each define an receiving recess 1515. At least one of the first retractable assembly 130 and the second retractable assembly 140 includes an elastic part 1310. The elastic part 1310 is arranged in the receiving recess 1515. The elastic part 1310 may be arranged in the receiving recess 1515 of the first mounting member 151, and the other elastic part 1310 may also be arranged in the receiving recess 1515 of the second mounting member 152. Optionally, the elastic part 1310 is a spiral spring. A majority portion of the coil of the spiral spring is in the receiving recess 1515, and an end of the spiral spring at an inner turn may be a free end, or may be connected to a fixing post 1512 in the receiving recess 1515, and an outer turn of the spiral spring extends out of the receiving recess 1515 and then is connected to the first headband assembly 110 or the second headband assembly 120.

In order to mounting the first headband assembly 110 and the second headband assembly 120, in embodiments of the present application, each of the first mounting member 151 and the second mounting member 152 is provided with a slide 1511, and the first end of the first headband assembly 110 is slidably arranged in the slide 1511 of the first mounting member 151, and the first end is connected to the elastic part 1310 on the first mounting member 151, and the second end of the first headband assembly 110 is fixedly connected to the second mounting member 152. If the display apparatus 200 is connected to the first mounting member 151 and the second mounting member 152, the first mounting member 151 and the second mounting member 152 move in the same direction as the display apparatus 200 is adjusted. For example, when the first mounting member 151 moves forward, the first end of the first headband assembly 110 can move toward the interior of the slide 1511 of the first mounting member 151 relative to the first mounting member 151. When the second mounting member 152 moves forward, the second end of the first headband assembly 110 moves synchronously with the second mounting member 152. In order to meet the requirement that the first mounting member 151 and the second mounting member 152 move together, the first headband assembly 110 can be configured as a deformable structure in embodiments of the present application, i.e., the first headband assembly 110 can be made of a flexible material, such as rubber, plastic, metal, or the like. When the first mounting member 151 and the second mounting member 152 move together, the first headband assembly 110 can deform so as to avoid interference from the first headband assembly 110 during the process of co-movement of the first mounting member 151 and the second mounting member 152.

Similarly, the fourth end of the second headband assembly 120 is slidably arranged in the slide 1511 of the second mounting member 152, and the fourth end is connected to the elastic part 1310 on the second mounting member 152, and the third end of the second headband assembly 120 is fixedly connected to the first mounting member 151. For example, when the first mounting member 151 moves forward, the third end of the second headband assembly 120 moves synchronously with the first mounting member 151. When the second mounting member 152 moves forward, the fourth end of the second headband assembly 120 can move toward the exterior of the slide 1511 of the second mounting member 152 relative to the second mounting member 152. In order to meet the requirement that the first mounting member 151 and the second mounting member 152 move together, the second headband assembly 120 can be configured as a deformable structure in embodiments of the present application, i.e., the second headband assembly 120 can be made of a flexible material, such as rubber, plastic, metal, or the like. When the first mounting member 151 and the second mounting member 152 move together, the second headband assembly 120 can deform so as to avoid interference from the second headband assembly 120 during the process of co-movement of the first mounting member 151 and the second mounting member 152.

In embodiments of the present application, the first headband assembly 110 and the second headband assembly 120 each have a trend of moving closer to each other, respectively, under the action of the elastic parts 1310. Thus, the orientation of the end of the elastic part 1310 at the outer turn connected to the first headband assembly 110 and the orientation of the end of the elastic part 1310 at the outer turn connected to the second headband assembly 120 are opposite, thereby providing a trend for the first headband assembly 110 and the second headband assembly 120, to move toward each other so that the headband apparatus 100 has a trend of retraction.

For the above embodiment, in the present application, the first retractable assembly 130 can be arranged at the first side of the headband apparatus 100, and the second retractable assembly 140 can be arranged at the second side of the headband apparatus 100, and the display apparatus 200 can be connected to the first retractable assembly 130 and the second retractable assembly 140. Optionally, the first retractable assembly 130 and the second retractable assembly 140 each include a housing, and the display apparatus 200 can be connected to respective housings of the first retractable assembly 130 and the second retractable assembly 140. Besides, it is also possible that the first mounting member 151 is arranged at the first side of the headband apparatus 100, and the second mounting member 152 is arranged at the second side of the headband apparatus 100, and the display apparatus 200 can be connected to the first mounting member 151 and the second mounting member 152.

Figure 15:
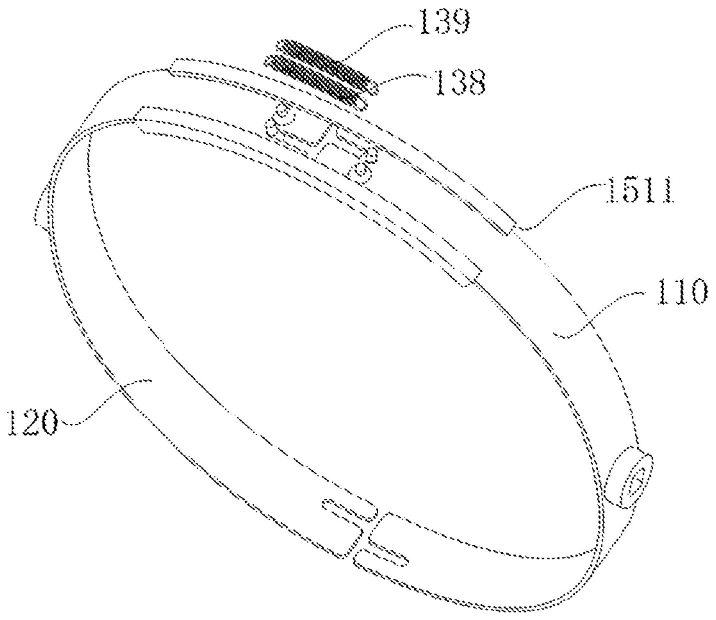
FIG. 15 a partial exploded view of a headband assembly, a retractable assembly and a mounting assembly in yet another headband apparatus disclosed in embodiments of the present application.

Referring to FIG. 15, in an optional embodiment, the headband apparatus 100 includes a mounting assembly 150. The mounting assembly 150 includes a first mounting member 151 and a second mounting member 152 (for simplicity, for example, the first mounting member 151 is shown in FIG. 15). Optionally, the first mounting member 151 and the second mounting member 152 are substantially same in structure, and each defines a slide 1511, and the first headband assembly 110 and the second headband assembly 120 are each partially slidably arranged in the slide 1511. At least one of the first retractable assembly 130 and the second retractable assembly 140 includes a first elastic member 138 and a second elastic member 139. The first elastic member

138 includes a first end and a second end. The first end is connected to the first mounting member 151 or the second mounting member 152 (e.g., the first end of the first elastic member 138 is connected to the first mounting member 151, as shown in FIG. 15), and the second end is connected to the first headband assembly 110. Optionally, the first elastic member 138 may be a tension spring, such as a constant force tension spring. The first mounting member 151 or the second mounting member 152 (e.g., the first mounting member 151, as shown in FIG. 15) is provided with a projecting post, and the first headband assembly 110 is provided with a limiting post. The tension spring has a first end sleeved over the projecting post and a second end sleeved over the limiting post. In this way, the first headband assembly 110 is connected to the first mounting member 151 or the second mounting member 152 by the tension spring.

Similarly, the second elastic member 139 also includes a first end and a second end. The first end is connected to the first mounting member 151 or the second mounting member 152 (e.g., the first end of the second elastic member 139 and the first end of the first elastic member 138 are both connected to the first mounting member 151), and the second end is connected to the second headband assembly 120. Optionally, the second elastic member 139 may be a tension spring, such as a constant force tension spring. The first mounting member 151 or the second mounting member 152 is provided with a projecting post, and the second headband assembly 120 is provided with a limiting post. The tension spring has a first end sleeved over the projecting post and a second end sleeved over the limiting post. In this way, the second headband assembly is connected to the first mounting member 151 or the second mounting member 152 by the tension spring. Based on the above configuration, the first elastic member 138 and the second elastic member 139 respectively provide tensile forces toward each other for the first headband assembly 110 and the second headband assembly 120, so that the first headband assembly 110 and the second headband assembly 120 have a trend of moving toward each other.

For the above embodiment, in the present application, the first headband assembly 110 can be arranged at the first side of the headband apparatus 100, and the second headband assembly 120 can be arranged at the second side of the headband apparatus 100, and the display apparatus 200 can be connected to the first headband assembly 110 and the second headband assembly 120. Of course, it is also possible that the first retractable assembly 130 is arranged at the first side of the headband apparatus 100, and the second retractable assembly 140 is arranged at the second side of the headband apparatus 100, and the display apparatus 200 can be connected to the first retractable assembly 130 and the second retractable assembly 140. Optionally, the first retractable assembly 130 and the second retractable assembly 140 each include a housing, and the display apparatus 200 can be connected to respective housings of the first retractable assembly 130 and the second retractable assembly 140. Besides, it is also possible that the first mounting member 151 is arranged at the first side of the headband apparatus 100, and the second mounting member 152 is arranged at the second side of the headband apparatus 100, and the display apparatus 200 can be connected to the first mounting member 151 and the second mounting member 152.

Figure 5:
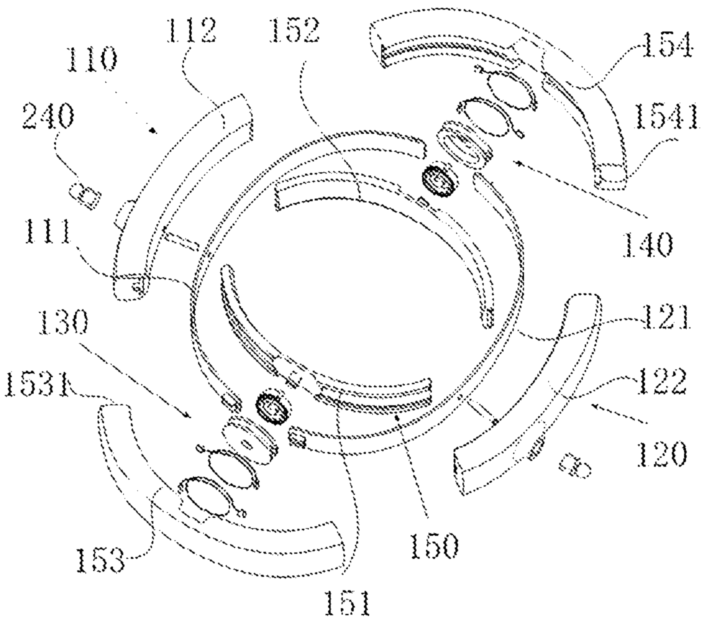
FIG. 5 is an exploded view of a headband apparatus disclosed in embodiments of the present application.

Referring to FIG. 5, in some optional embodiments, the mounting assembly 150 further includes a first housing 153 and a second housing 154. Optionally, the first housing 153 and the second housing 154 may be arc-shaped body structures. The first housing 153 is adapted to the first mounting member 151, and the second housing 154 is adapted to the second mounting member 152. The first housing 153 is provided with a first accommodating space 1531. The first accommodating space 1531 can be arranged along a length direction of the first housing 153. During assembling, the first mounting member 151 can be embedded in the first accommodating space 1531. Since the first headband assembly 110 and the second headband assembly 120 are partially slidably arranged on the first mounting member 151, the segment of the first headband assembly 110 adjacent to the first end is located between the first mounting member 151 and the first housing 153, and the segment of the second headband assembly 120 adjacent to the third end is located between the first mounting member 151 and the first housing 153, so that the stability of the installation and movement of the first headband assembly 110 and the second headband assembly 120 can be further improved. Similarly, the second housing 154 is provided with a second accommodating space 1541. Optionally, the second accommodating space 1541 can be arranged along a length direction of the second housing 154. During assembling, the second mounting member 152 can be embedded in the second accommodating space 1541. Since the first headband assembly 110 and the second headband assembly 120 are partially slidably arranged on the second mounting member 152, the segment of the first headband assembly 110 adjacent to the second end is located between the second mounting member 152 and the second housing 154, and the segment of the second headband assembly 120 adjacent to the fourth end is located between the second mounting member 152 and the second housing 154, so that the stability of the installation and movement of the first headband assembly 110 and the second headband assembly 120 can be further improved.

Based on the above configuration, the first housing 153 and the second housing 154 can respectively implement the assembling of the first mounting member 151 and the second mounting member 152, and can also cover the first retractable assembly 130 and the second retractable assembly 140 that are mounted on the first mounting member 151 and the second mounting member 152 respectively. The first housing 153 and the second housing 154 also have a decorative effect and a protective effect, which not only ensure the appearance performance of the whole headband apparatus 100, but also ensure that parts and components of the headband apparatus 100 are protected from external interference.

Still referring to FIG. 5, in some optional embodiments, the first headband assembly 110 includes a first headband body 111 and a third housing 112. The first headband body 111 is fixed to the third housing 112, and the display apparatus 200 is connected to the third housing 112. Optionally, the third housing 112 is adapted to the first headband body 111. Since the first headband assembly 110 is configured to be worn on a user's head, the first headband body 111 is an arc-shaped member. Accordingly, the third housing 112 can be an arc-shaped body structure. During assembling, the first headband body 111 can be fixed to an arc-shaped inner surface of the third housing 112. It is also possible that the third housing 112 is provided with a mounting channel, and the first headband body 111 is arranged into the mounting channel and fixed by means of fasteners, adhesive bonding, snap-in fitting, or the like, so that fixed installation of the first headband body 111 and the third housing 112 can be ensured.

It should be noted here that the third housing 112 can partially cover the first headband body 111, and can improve the appearance performance of the headband apparatus 100 to some extent. Besides, the shape of the third housing 112 can also be adapted to the first housing 153 and the second housing 154. When the headband apparatus 100 is not extended (in a retracted state), an end of the third housing 112 is butt-jointed with the first housing 153, and another end of the third housing is butt-jointed with the second housing 154, so that the first housing 153, the third housing 112 and the second housing 154 are connected successively to cover the first headband body 111, thus achieving both a decorative effect and a protective effect.

Similarly, the second headband assembly 120 includes a second headband body 121 and a fourth housing 122. The second headband body 121 is fixed to the fourth housing 122, and the display apparatus 200 is connected to the fourth housing 122. Optionally, the fourth housing 122 is adapted to the second headband body 121. Since the second headband assembly 120 is configured to be worn on a user's head, the second headband body 121 is an arc-shaped member. Accordingly, the fourth housing 122 can be an arc-shaped body structure. During assembling, the second headband body 121 can be fixed to an arc-shaped inner surface of the fourth housing 122. It is also possible that the fourth housing 122 is provided with a mounting channel, and the second headband body 121 is arranged into the mounting channel and fixed by means of fasteners, adhesive bonding, snap-in fitting, or the like, so that the fixed installation of the second headband body 121 and the fourth housing 122 can be ensured.

It should be noted here that the fourth housing 122 can partially cover the second headband body 121, and can improve the appearance performance of the headband apparatus 100 to some extent. Besides, the shape of the fourth housing 122 can also be adapted to the first housing 153 and the second housing 154. When the headband apparatus 100 is not extended (in a retracted state), an end of the fourth housing 122 is butt-jointed with the first housing 153, and another end of the fourth housing is butt-jointed with the second housing 154, so that the first housing 153, the fourth housing 122 and the second housing 154 are connected successively to cover the second headband body 121, thus achieving both a decorative effect and a protective effect.

Based on the above configuration, the first housing 153, the third housing 112, the second housing 154 and the fourth housing 122 are jointly located at an outer periphery of the headband apparatus 100, thus achieving decorative and protective effects on the circle of outer periphery of the headband apparatus 100.

For the sake of simplicity, the following embodiment is described using an example in which the first headband assembly 110 is arranged at the first side of the headband apparatus 100, the second headband assembly 120 is arranged at the second side of the headband apparatus 100, and the display apparatus 200 is connected to the first headband assembly 110 and the second headband assembly 120. It can be understood that the arrangement in the following embodiment may also be used in embodiments where the first retractable assembly 130 is arranged at the first side of the headband apparatus 100, the second retractable assembly 140 is arranged at the second side of the headband apparatus 100, and the display apparatus 200 is connected to the first retractable assembly 130 and the second retractable assembly 140, respectively.

Figure 19:
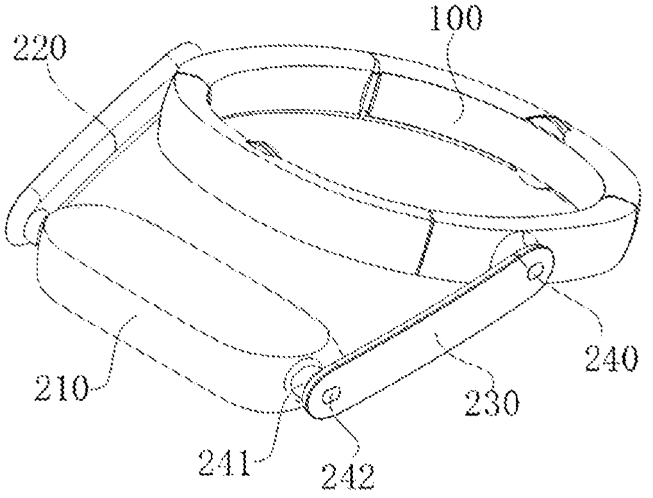
FIG. 19 is an assembly view of a display apparatus and a headband apparatus disclosed in embodiments of the present application.

Referring to FIG. 19, in some optional embodiments, the display apparatus 200 includes a display body 210, a first connecting arm 220, and a second connecting arm 230. One end of the first connecting arm 220 is connected to one end of the display body 210, and the other end of the first connecting arm 220 is connected to the first headband assembly 110, thereby connecting the one end of the display body 210 to the first headband assembly 110 by the first connecting arm 220. One end of the second connecting arm 230 is connected at the other end of the display body 210, and the other end of the second connecting arm 230 is connected to the second headband assembly 120, thereby connecting the other end of the display body 210 to the second headband assembly 120 by the second connecting arm 230. In this way, the display body 210 is mounted to the headband apparatus 100 by the first connecting arm 220 and the second connecting arm 230, and a user can locate the display body 210 in a set position during wearing the headband apparatus 100 to ensure that the user can observe the display body 210.

To adjust the position of the display body 210, in embodiments of the present application, the first connecting arm 220 is movably connected to at least one of the display body 210 and the first headband assembly 110, and the second connecting arm 230 is movably connected to at least one of the display body 210 and the second headband assembly 120. Optionally, the connection may be such that one end of the first connecting arm 220 is movably connected to the display body 210, and the other end of the first connecting arm 220 is fixedly connected to the first headband assembly 110; and one end of the second connecting arm 230 is movably connected to the display body 210, and the other end of the second connecting arm 230 is fixedly connected to the second headband assembly 120. The connection may also be such that one end of the first connecting arm 220 is fixedly connected to the display body 210, and the other end of the first connecting arm 220 is movably connected to the first headband assembly 110; and one end of the second connecting arm 230 is fixedly connected to the display body 210, and the other end of the second connecting arm 230 is movably connected to the second headband assembly 120. The connection may also be such that one end of the first connecting arm 220 is movably connected to the display body 210, and the other end of the first connecting arm 220 is movably connected to the first headband assembly 110; and one end of the second connecting arm 230 is movably connected to the display body 210, and the other end of the second connecting arm 230 is movably connected to the second headband assembly 120. In addition, other connection modes are also possible, and specific connection modes are not limited in embodiments of the present application, as long as the display body 210 can move relative to the headband apparatus 100, so as to adjust the position of the display body 210 relative to the face, eyes, or other part when the user wears the headband apparatus 100.

Still referring to FIG. 19, the head-mounted display device further includes a joint 240. The joint 240 is movably connected to two parts of at least one of a first rotation group, a second rotation group, a third rotation group, and a fourth rotation group. The joint 240 allows relative movement between the two parts of the at least one rotation group so that the display body 210 can move relative to the headband device 100. Two parts of the first rotation group are the first connecting arm 220 and the first headband assembly 110 respectively, i.e., the first connecting arm 220 and the first headband assembly 110 can be movably connected to each other by a joint 240. Two parts of the second rotation group are the second connecting arm 230 and the second headband assembly 120 respectively, i.e., the second connecting arm 230 and the second headband assembly 120 can be movably connected to each other by a joint 240. Two parts of the third rotation group are the first connecting arm

220 and the display body 210 respectively, i.e., the first connecting arm 220 and the display body 210 can be movably connected to each other by a joint 240. Two parts of the fourth rotation group are the second connecting arm 230 and the display body 210 respectively, i.e., the second connecting arm 230 and the display body 210 can be movably connected to each other by a joint 240. In some optional embodiments, two ends of the first connecting arm 220 are connected to the first headband assembly 110 and the display body 210, respectively, by joints 240, and two ends of the second connecting arm 230 are connected to the second headband assembly 120 and the display body 210, respectively, by joints 240. In this way, the display body 210 can swing with the first connecting arm 220 and the second connecting arm 230 relative to the headband apparatus 100, so that the height of the display body 210 relative to the headband apparatus 100 can be adjusted to adjust a position of the display body 210 in an up-down direction along a user's face. The display body 210 can also rotate relative to the first connecting arm 220 and the second connecting arm 230 to adjust the angle of the display body 210 itself so that the display body 210 can face the user's eyes. As the display body 210 swings with the first connecting arm 220 and the second connecting arm 230 relative to the headband apparatus 100, and the display body 210 rotates relative to the first connecting arm 220 and the second connecting arm 230, it can facilitate storage of the head-mounted display device when the head-mounted display device is not in use.

It should be noted here that when the headband apparatus 100 is extended, the first headband assembly 110 and the second headband assembly 120 can move away from each other so that the distance therebetween increases, at which point due to the presence of the joint 240, e.g., the joint 240 provided between the two parts of the first rotation group and the joint 240 provided between the two parts of the second rotation group, the end of the first connecting arm 220 connected to the first headband assembly 110 can be tilted outward with the first headband assembly 110, and the end of the second connecting arm 230 connected to the second headband assembly 120 can be tilted outward with the second headband assembly 120. Based on the above configuration, when a user wears the headband apparatus 100, since a pressing force on the first headband assembly 110 caused by the first connecting arm 220 is small, and a pressing force on the second headband assembly 120 caused by the second connecting arm 230 is small, a pressing effect of the first headband assembly 110 and the second headband assembly 120 on the user's head is small, thus alleviating the head pinching problem caused by the headband apparatus 100. Of course, it is also possible that joints 240 are provided between the two parts of the first rotation group, between the two parts of the second rotation group, between the two parts of the third rotation group, and between the two parts of the fourth rotation group, respectively, to achieve free movement of the display body 210, and free movement of the first connecting arm 220 and the second connecting arm 230, thereby meeting actual needs of different users.

Figure 16:
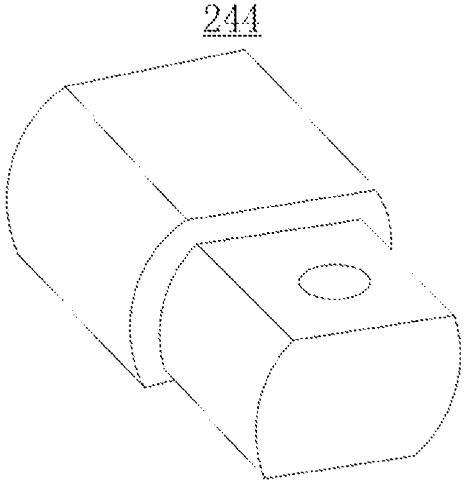
FIG. 16 is a structural view of a joint disclosed in embodiments of the present application.
Figure 17:
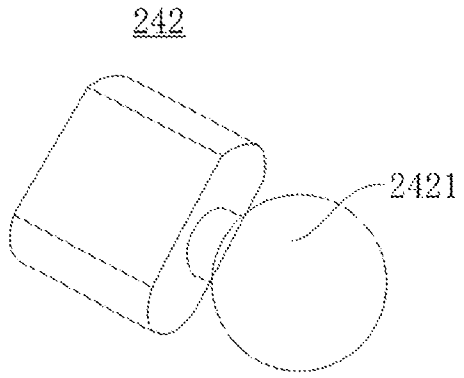
FIG. 17 is a structural view of another joint disclosed in embodiments of the present application.
Figure 18:
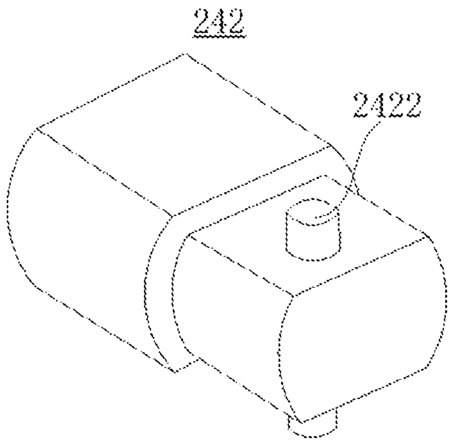
FIG. 18 is a structural view of yet another joint disclosed in embodiments of the present application.

Referring to FIGS. 16 to 18, in some embodiments, the joint 240 may include a fixed portion 241 and a movable portion 242. The movable portion 242 is rotatable relative to the fixed portion 241. The fixed portion 241 is fixedly connected to or provided integrally with a first component, and the movable portion 242 is connected to a second component. The first component includes at least one of the first headband assembly 110, the second headband assembly 120, and the display body 210, and the second component includes at least one of the first connecting arm 220 and the second connecting arm 230. In an embodiment, two ends of the display body 210 are connected to fixed portions 241 respectively; the first headband assembly 110 and the second headband assembly 120 are connected to fixed portions 241 respectively; two ends of the first connecting arm 220 are connected to movable portions 242 respectively; and two ends of the second connecting arm 230 are connected to movable portions 242 respectively. Relative movement between the first connecting arm 220 and the display body 210, relative movement between the first connecting arm 220 and the first headband assembly 110, relative movement between the second connecting arm 230 and the display body 210, and relative movement between the second connecting arm 230 and the second headband assembly 120 can be achieved by relative movement between the movable portion 242 and the fixed portion 241, thereby facilitating the adjustment of the position of the display body 210.

Optionally, the movable portion 242 may include a ball joint 2421. The ball joint 2421 is connected to the first connecting arm 220 or the second connecting arm 230 so that the second part is rotatable relative to the first component through the ball joint 2421. Based on the configuration of the ball joint 2421, the first connecting arm 220 can swing at any angle and in any orientation relative to the display body 210 or the first headband assembly 110, and the second connecting arm 230 can swing at any angle and in any orientation relative to the display body 210 or the second headband assembly 120, thus increasing the adjustment range of the display body 210, such that actual needs of more users can be met, and also, the head pinching problem caused by the connecting arms after the headband apparatus 100 is extended can be effectively alleviated. Such exemplary joints 240 can also be provided between the connecting arms and the display body 210.

Optionally, the movable portion 242 is rotatable about a first axis relative to the fixed portion 241. The movable portion 242 includes a shaft 2422 arranged at an angle with the first axis, and the second component is rotatable relative to the first component through the shaft 2422. The first axis may be parallel to a connecting line along two ends of the display body 210. For example, the display body 210 is located in front of a user, and its two ends are a left end and a right end, and in this case, the first axis is arranged along a left-right direction of the user. Since the movable portion 242 is rotatable about the first axis relative to the fixed portion 241, the display body 210 can be flipped to adjust the angle of the display body 210 relative to the first connecting arm 220 and the second connecting arm 230. The shaft 2422 can be arranged in an up-down direction along the user, and the movable portion 242 is connected to the first connecting arm 220 or the second connecting arm 230 by the shaft 2422, so that the first connecting arm 220 or the second connecting arm 230 can be tilted. That is, in a state where the headband apparatus 100 is extended, the end of the first connecting arm 220 connected to the display body 210 and the end of the second connecting arm 230 connected to the display body 210 can respectively rotate about the shaft 2422 relative to the display body 210. The end of the first connecting arm 220 connected to the first headband assembly 110 and the end of the second connecting arm 230 connected to the second headband assembly 120 can be flared out, respectively. When the headband apparatus 100 is extended, the pressing force on the first headband assembly 110 caused by the first connecting arm 220 and the pressing force on the second headband assembly 120 caused by the second connecting arm 230 can be reduced, and thus the head pinching problem caused by the headband apparatus

100 can be effectively alleviated. Such exemplary joints 240 can also be provided between the connecting arms and the headband apparatus 100.

Figure 20:
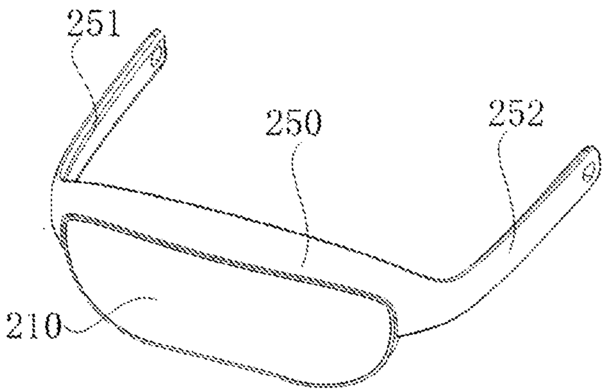
FIG. 20 is a schematic view of a display apparatus disclosed in embodiments of the present application in a first state.
Figure 21:
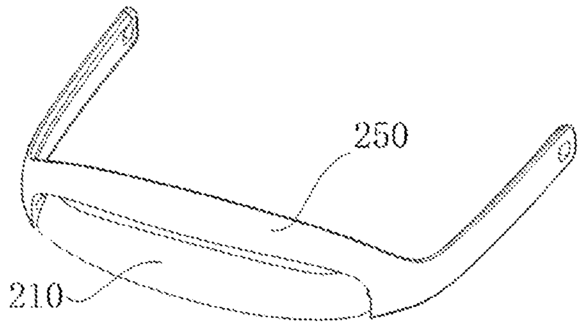
FIG. 21 is a schematic view of a display apparatus disclosed in embodiments of the present application in a second state.

In some embodiments, the display apparatus 200 may also include a display body 210 and a bracket 250. Two ends of the display body 210 are rotatably arranged on the bracket 250 so that the display body 210 can be rotated relative to the bracket 250. The display body 210 is opposite a user's face, eyes, or other part, when being flipped open with respect to the bracket 250, as shown in FIG. 20. Alternatively, the user's face, eyes, or other part can be avoided when the display body 210 is flipped closed relative to the bracket 250, as shown in FIG. 21. Based on the above configuration, the user can rotate the display body 210 to be opened relative to the bracket 250 when using the head-mounted display device, to facilitate the user observing the display body 210. After use is completed, the display body 210 can be rotated to be closed relative to the bracket 250 to provide some protection for the display body 210 and alleviate touching of the display body 210.

Optionally, the bracket 250 has a third connecting arm 251 and a fourth connecting arm 252. The third connecting arm 251 is movably connected to the first headband assembly 110, and the fourth connecting arm 252 is movably connected to the second headband assembly 120. In this implementation, the bracket 250 may be a one-piece structure. Based on the above configuration, the third connecting arm 251 can move relative to the first headband assembly 110, and the fourth connecting arm 252 can move relative to the second headband assembly 120, so that the position of the display body 210 relative to the headband apparatus 100 can be adjusted, and a user can adjust the relative position of the display body 210 to the face, eyes, or other part of the user when wearing the headband apparatus 100.

Optionally, the head-mounted display device further includes a joint 240, wherein the third connecting arm 251 and the first headband assembly 110 may be movably connected by a joint 240; or the fourth connecting arm 252 and the second headband assembly 120 may also be movably connected by a joint 240; or the third connecting arm 251 and the first headband assembly 110 are movably connected by a joint 240, and the fourth connecting arm 252 and the second headband assembly 120 are movably connected by a joint 240. It should be noted here that the joint 240 in this embodiment has the same specific structure and achieves the same effect as the joint 240 connecting two parts of at least one of the first rotation group, the second rotation group, the third rotation group and the fourth rotation group as described above. In this way, the joint 240 in this embodiment not only allows the bracket 250 and the display body 210 arranged on the bracket 250 to swing relative to the headband apparatus 100 to adjust the position of the display body 210, but also can reduce the pressing effect of the third connecting arm 251 on the first headband assembly 110 and the pressing effect of the fourth connecting arm 252 on the second headband assembly 120 when the headband apparatus 100 is extended, to alleviate the head pinching problem of the headband apparatus 100.

In some embodiments, the head-mounted display device further includes a limiting structure for limiting movement of at least one of the first headband assembly 110 and the second headband assembly 120. Optionally, the limiting structure can be provided on at least one of the first mounting member 151 and the second mounting member 152, e.g., a compression screw, a clamping member, or the like. Since the first headband assembly 110 and the second headband assembly 120 are subject to elastic forces from the elastic component 131, the elastic element, the elastic member, and the elastic part 1310, respectively, and both the first headband assembly 110 and the second headband assembly 120 are slidably connected to the first mounting member 151 or both are slidably connected to the second mounting member 152, when the friction between headband assemblies (the first headband assembly 110 and the second headband assembly 120) and the first mounting member 151 or the second mounting member 152 is relatively small, the headband apparatus 100 has a trend of retraction under the action of the elastic forces, such that the headband apparatus 100 has a trend of pinching a user's head, thereby bringing the user a sense of discomfort from pinching his head. Based on this, the movement of both the first headband assembly 110 and the second headband assembly 120 relative to the first mounting member 151 or the second mounting member 152 can be limited to some extent by the limiting structure. The limiting structure can effectively prevent retraction of the headband apparatus 100, and thus can effectively alleviate the problem of the headband apparatus 100 pinching the user's head, thus improving the comfort of the user wearing the headband apparatus 100, and further improving the user experience. Besides, the limiting structure may also be a structure with a damping effect, and can counteract some of the elastic forces to some extent to alleviate the problem of pinching the user's head caused by the first headband assembly 110 and the second headband assembly 120. Of course, the specific structure and arrangement of the limiting structure are not limited in embodiments of the present application, as long as it can function to obstruct the retraction process of the headband apparatus 100 to some extent.

Some feasible embodiments are listed below.

In an example, a head-mounted display device is provided, including: a display apparatus; and a headband apparatus, the headband apparatus including: a first headband assembly; a second headband assembly, the second headband assembly and the first headband assembly being connected to two ends of the display apparatus respectively; a first retractable assembly, the first retractable assembly connected to adjacent ends of the first headband assembly and the second headband assembly; and a second retractable assembly, the second retractable assembly being arranged opposite to the first retractable assembly, the second retractable assembly connected to adjacent ends of the first headband assembly and the second headband assembly. In the case where at least one of the first retractable assembly and the second retractable assembly is in an extended state, when an external force is applied to at least one of the first headband assembly and the second headband assembly, the display apparatus is movable with the first headband assembly and the second headband assembly so as to move in a first direction or a direction opposite to the first direction.

In an example, a headband apparatus for a head-mounted display device is provided, the headband apparatus including: a first headband assembly, the first headband assembly including a first end and a second end arranged opposite each other; a second headband assembly, the second headband assembly including a third end and a fourth end arranged opposite each other; a first retractable assembly, the first retractable assembly connected to the first end of the first headband assembly and the third end of the second headband assembly; and a second retractable assembly, the second retractable assembly being arranged opposite to the first retractable assembly, the second retractable assembly connected to the second end of the first headband assembly and the fourth end of the second headband assembly. In the case where at least one of the first retractable assembly and the second retractable assembly is in an extended state, when an external force is applied to at least one of the first headband assembly and the second headband assembly, the first end of the first headband assembly is movable relative to the third end of the second headband assembly, and the second end of the first headband assembly is movable relative to the fourth end of the second headband assembly, and a trend of relative movement of the first end of the first headband assembly and the third end of the second headband assembly is opposite to a trend of relative movement of the second end of the first headband assembly and the fourth end of the second headband assembly. In addition, the headband apparatus may further include an annular connecting strap; the first headband assembly and the second headband assembly are fixedly connected to the connecting strap; and movement of a portion of the connecting strap connected to the first headband assembly and movement of a portion of the connecting strap connected to the second headband assembly are in opposite directions as the connecting strap rotates.

In an example, the first mounting member and the second mounting member each are provided with a fixing post, and a turntable is rotatably connected to the fixing post; the fixing post is provided with a first limiting groove, and the turntable is provided with an accommodating recess and a second limiting groove in an inner wall defining the accommodating recess; and the elastic component is a spiral spring, which is arranged in the accommodating recess, and two ends of the spiral spring are arranged in the first limiting groove and the second limiting groove respectively.

In an example, an outer periphery of the turntable is provided with an annular groove along the direction of its circumference, and a first traction cord and a second traction cord are winded in the annular groove; an outer periphery of the turntable is also provided with a first fixing groove, and the first headband assembly and the second headband assembly each are provided with a second fixing groove; and the first traction cord and the second traction cord are each provided with fixing blocks at two ends, and the fixing blocks at the two ends of each traction cord are respectively arranged correspondingly in the first fixing groove and the second fixing groove.

In an example, the headband apparatus further includes a mounting assembly, the mounting assembly including a first mounting member and a second mounting member; the first mounting member and the second mounting member each defines a first accommodating recess and a second accommodating recess; and at least one of the first retractable assembly and the second retractable assembly includes a first elastic element and a second elastic element, the first elastic element including a first end accommodated in the first accommodating recess, and a second end connected to the first headband assembly, the second elastic element including a first end accommodated in the second accommodating recess, and a second end connected to the second headband assembly, the second end of the first elastic element and the second end of the second elastic element facing opposite directions.

In an example, the first headband assembly includes a first headband body and a third housing, the first headband body being fixed to the third housing, and the display apparatus being connected to the third housing; and the second headband assembly includes a second headband body and a fourth housing, the second headband body being fixed to the fourth housing, and the display apparatus being connected to the fourth housing.

In an example, the joint includes a fixed portion fixedly connected to or provided integrally with a first component, and a movable portion connected to a second component, the movable portion being rotatable relative to the fixed portion; the first component includes at least one of the first headband assembly, the second headband assembly, and a display body; and the second component includes at least one of a first connecting arm and a second connecting arm.

In an example, the movable portion includes a ball joint connected to the first connecting arm or the second connecting arm, and the second component is rotatable relative to the first component through the ball joint.

In an example, the movable portion is rotatable about a first axis relative to the fixed portion, and the movable portion includes a shaft arranged at an angle with the first axis, and the second component is rotatable relative to the first component through the shaft.

In an example, the display apparatus includes a display body and a bracket; two ends of the display body are rotatably arranged on the bracket, and the bracket has a third connecting arm and a fourth connecting arm, the third connecting arm being movably connected to the first headband assembly, and the fourth connecting arm being movably connected to the second headband assembly.

In an example, the head-mounted display device further includes a joint, which is movably connected between the third connecting arm and the first headband assembly, and/or between the fourth connecting arm and the second headband assembly.

In an example, the head-mounted display device further includes a limiting structure for limiting movement of at least one of the first headband assembly and the second headband assembly.

Embodiments of the present application are described above in conjunction with the accompanying drawings, but the present application is not limited to the specific implementations described above. The foregoing specific implementations are only schematic and not restrictive. Under the enlightenment of the present application, those of ordinary skill in the art can also make many forms without departing from the spirit of the present application and the protection scope of the claims, and these all fall within the protection of the present application.

The invention claimed is:

1. A head-mounted display device, comprising:

a display apparatus; and a headband apparatus having a first side and a second side opposite the first side, the first side and the second side being connected to the display apparatus, the headband apparatus comprising:

a first headband assembly having a first end and a second end arranged opposite each other;

a second headband assembly arranged opposite to the first headband assembly, and having a third end and a fourth end arranged opposite each other;

a first retractable assembly connected to the first end of the first headband assembly and the third end of the second headband assembly; and a second retractable assembly arranged opposite to the first retractable assembly, and connected to the second end of the first headband assembly and the fourth end of the second headband assembly, wherein in a case where at least one of the first retractable assembly and the second retractable assembly is in an extended state, when an external force is applied to at least one of the first headband assembly and the second headband assembly, the first end of the first headband assembly is movable relative to the third end of the second headband assembly, and the second end of the first headband assembly is movable relative to the fourth end of the second headband assembly, and a trend of movement of the first end of the first headband assembly relative to the third end of the second headband assembly is opposite to a trend of movement of the second end of the first headband assembly relative to the fourth end of the second headband assembly, such that the display apparatus is movable in a first direction or a direction opposite to the first direction, the first direction being perpendicular to an arrangement direction of the first side and the second side of the headband apparatus.

2. The head-mounted display device according to claim 1, wherein the headband apparatus is configured in one of the following arrangements:

the first headband assembly is arranged at the first side of the headband apparatus, and the second headband assembly is arranged at the second side of the headband apparatus; and the first retractable assembly is arranged at the first side of the headband apparatus, and the second retractable assembly is arranged at the second side of the headband apparatus.

3. The head-mounted display device according to claim 1, wherein the headband apparatus further comprises a mounting assembly, the mounting assembly comprising a first mounting member connected to the first retractable assembly and a second mounting member connected to the second retractable assembly.

4. The head-mounted display device according to claim 3, wherein the first mounting member and the second mounting member each have a slide, with a segment of the first headband assembly adjacent to the first end and a segment of the second headband assembly adjacent to the third end being slidably arranged in the slide of the first mounting member, and a segment of the first headband assembly adjacent to the second end and a segment of the second headband assembly adjacent to the fourth end being slidably arranged in the slide of the second mounting member.

5. The head-mounted display device according to claim 3, wherein the first retractable assembly and the second retractable assembly each comprise an elastic component, a turntable, a first traction cord and a second traction cord, the turntable being rotatably provided on each of the first mounting member and the second mounting member, the elastic component being connected between each of the first mounting member and the second mounting member, and the turntable, the first traction cord and the second traction cord being wound around the turntable, two ends of the first traction cord being connected to the first headband assembly and the turntable, respectively, two ends of the second traction cord being connected to the second headband assembly and the turntable, respectively.

6. The head-mounted display device according to claim 3, wherein a connecting strap is wound around at least one of the first mounting member and the second mounting member, the first headband assembly and the second headband assembly are fixedly connected to the connecting strap, and movement of a portion of the connecting strap connected to the first headband assembly and movement of a portion of the connecting strap connected to the second headband assembly are in opposite directions during rotation of the connecting strap.

7. The head-mounted display device according to claim 5, wherein a connecting strap is wound around at least one of the first mounting member and the second mounting member, the first traction cord and the second traction cord are fixedly connected to the connecting strap, and movement of a portion of the connecting strap connected to the first traction cord and movement of a portion of the connecting strap connected to the second traction cord are in opposite directions during rotation of the connecting strap.

8. The head-mounted display device according to claim 6, wherein at least one of the first mounting member and the second mounting member is provided with a ring groove at an outer periphery, and the connecting strap is configured as an annular cord sleeved in the ring groove, the annular cord being movable in the ring groove.

9. The head-mounted display device according to claim 3, wherein at least one of the first retractable assembly and the second retractable assembly comprises:

a first elastic member comprising a first end connected to one of the first mounting member and the second mounting member, and a second end connected to the first headband assembly; and a second elastic member comprising a first end connected to the same one of the first mounting member and the second mounting member, and a second end connected to the second headband assembly.

10. The head-mounted display device according to claim 9, wherein each of the first mounting member and the second mounting member defines a first accommodating recess and a second accommodating recess, the first accommodating recess and the second accommodating recess being arranged on two opposing sides of each of the first mounting member and the second mounting member, respectively, the first elastic member is a first elastic element, and the second elastic member is a second elastic element; the first elastic element comprises a first end accommodated in the first accommodating recess and a second end connected to the first headband assembly; and the second elastic element comprises a first end accommodated in the second accommodating recess and a second end connected to the second headband assembly, the second end of the first elastic element and the second end of the second elastic element being movable in opposite directions.

11. The head-mounted display device according to claim 3, wherein the first mounting member defines a first receiving recess, and the second mounting member defines a second receiving recess; the first retractable assembly comprises a first elastic part arranged in the first receiving recess, and the second retractable assembly comprises a second elastic part arranged in the second receiving recess; the first end of the first headband assembly is slidably arranged in the first mounting member and connected to the first elastic part, the second end of the first headband assembly is fixedly connected to the second mounting member, the third end of the second headband assembly is fixedly connected to the first mounting member, and the fourth end of the second headband assembly is slidably arranged in the second mounting member and connected to the second elastic part; and a trend of movement of the first headband assembly under the drive of the first elastic part is opposite to a trend of movement of the second headband assembly under the drive of the second elastic part.

12. The head-mounted display device according to claim 3, wherein the mounting assembly further comprises a first housing and a second housing; the first housing is provided with a first accommodating space, the first mounting member being arranged in the first accommodating space, and both a segment of the first headband assembly adjacent to the first end and a segment of the second headband assembly adjacent to the third end being located between the first mounting member and the first housing; and the second housing is provided with a second accommodating space, the second mounting member being arranged in the second accommodating space, and both a segment of the first headband assembly adjacent to the second end and a segment of the second headband assembly adjacent to the fourth end being located between the second mounting member and the second housing.

13. The head-mounted display device according to claim 1, wherein the display apparatus comprises a display body, a first connecting arm and a second connecting arm, the first connecting arm connecting an end of the display body to the first headband assembly, and the second connecting arm connecting another end of the display body to the second headband assembly; the first connecting arm being movably connected to at least one of the display body and the first headband assembly, and the second connecting arm being movably connected to at least one of the display body and the second headband assembly.

14. The head-mounted display device according to claim 13, wherein the head-mounted display device further comprises a joint, the joint being movably connected to two parts of at least one of a first rotation group, a second rotation group, a third rotation group and a fourth rotation group, two parts of the first rotation group being the first connecting arm and the first headband assembly respectively, two parts of the second rotation group being the second connecting arm and the second headband assembly respectively, two parts of the third rotation group being the first connecting arm and the display body respectively, and two parts of the fourth rotation group being the second connecting arm and the display body respectively.

15. The head-mounted display device according to claim 1, wherein when an external force is applied to at least one of the first side and the second side of the headband apparatus, the first end of the first headband assembly and the third end of the second headband assembly move toward each other, and the second end of the first headband assembly and the fourth end of the second headband assembly move away from each other, or the first end of the first headband assembly and the third end of the second headband assembly move away from each other, and the second end of the first headband assembly and the fourth end of the second headband assembly move toward each other.

16. A headband apparatus for a head-mounted display device comprising:

a first headband assembly, the first headband assembly comprising a first end and a second end arranged opposite each other;

a second headband assembly, the second headband assembly comprising a third end and a fourth end arranged opposite each other;

a first retractable assembly, the first retractable assembly being connected to the first end of the first headband assembly and the third end of the second headband assembly; and a second retractable assembly, the second retractable assembly being arranged opposite to the first retractable assembly, the second retractable assembly connected to the second end of the first headband assembly and the fourth end of the second headband assembly, wherein in a case where at least one of the first retractable assembly and the second retractable assembly is in an extended state, when an external force is applied to at least one of the first headband assembly and the second headband assembly, the first end of the first headband assembly is movable relative to the third end of the second headband assembly, and the second end of the first headband assembly is movable relative to the fourth end of the second headband assembly, and a trend of relative movement of the first end of the first headband assembly and the third end of the second headband assembly is opposite to a trend of relative movement of the second end of the first headband assembly and the fourth end of the second headband assembly.

17. The headband apparatus according to claim 16, wherein the first retractable assembly and the second retractable assembly each comprises a constant force spring.

18. The headband apparatus according to claim 16, further comprising an annular connecting strap, the first headband assembly and the second headband assembly are fixedly connected to the connecting strap, and movement of a portion of the connecting strap connected to the first headband assembly and movement of a portion of the connecting strap connected to the second headband assembly are in opposite directions as the connecting strap rotates.

19. A head-mounted display device comprising:

a display apparatus; and a headband apparatus, the headband apparatus comprising:

a first headband assembly, the first headband assembly comprising a first end and a second end arranged opposite each other;

a second headband assembly, the second headband assembly and the first headband assembly being connected to two ends of the display apparatus respectively, and the second headband assembly comprising a third end and a fourth end arranged opposite each other;

a first retractable assembly, the first retractable assembly connected to the first end of the first headband assembly and the third end of the second headband assembly; and a second retractable assembly, the second retractable assembly being arranged opposite to the first retractable assembly, the second retractable assembly connected to the second end of the first headband assembly and the fourth end of the second headband assembly, wherein in a case where at least one of the first retractable assembly and the second retractable assembly is in an extended state, when an external force is applied to at least one of the first headband assembly and the second headband assembly, the first end of the first headband assembly is movable relative to the third end of the second headband assembly, and the second end of the first headband assembly is movable relative to the fourth end of the second headband assembly, and a trend of movement of the first end of the first headband assembly relative to the third end of the second headband assembly is opposite to a trend of movement of the second end of the first headband assembly relative to the fourth end of the second headband assembly, such that the display apparatus is movable with the first headband assembly and the second headband assembly so as to move in a first direction or a direction opposite to the first direction.

* * * * *